United States Patent
Zhao et al.

(10) Patent No.: US 8,118,607 B2
(45) Date of Patent: Feb. 21, 2012

(54) ELECTRONIC CARD WITH PROTECTING MECHANISM FOR PROTECTING CONTACTS THEREOF

(75) Inventors: Qi-Jun Zhao, Kunshan (CN); Li Li, Kunshan (CN); Hua Yin, Kunshan (CN)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 0 days.

(21) Appl. No.: 12/813,524

(22) Filed: Jun. 11, 2010

(65) Prior Publication Data
US 2010/0317205 A1   Dec. 16, 2010

(51) Int. Cl.
*H01R 13/44*   (2006.01)
(52) U.S. Cl. ........................................................ 439/136
(58) Field of Classification Search ................... 439/136, 439/81, 55, 358, 630, 159, 637; 358/1.16; 361/737, 715, 727, 679, 752
See application file for complete search history.

(56) References Cited

U.S. PATENT DOCUMENTS

| | | | |
|---|---|---|---|
| 7,448,912 B1* | 11/2008 | Shiue et al. | 439/630 |
| 7,819,678 B2* | 10/2010 | Ye et al. | 439/159 |
| 7,878,858 B1* | 2/2011 | Tung et al. | 439/630 |
| 2008/0218799 A1* | 9/2008 | Hiew et al. | 358/1.16 |
| 2009/0093136 A1 | 4/2009 | Hiew et al. | |
| 2010/0093200 A1* | 4/2010 | Ye et al. | 439/159 |

* cited by examiner

*Primary Examiner* — Alexander Gilman
(74) *Attorney, Agent, or Firm* — Wei Te Chung; Andrew C. Cheng; Ming Chieh Chang (57) ABSTRACT

An electronic card includes a housing, a plurality of contacts retain on the housing and a slider movably retained on the housing. The housing has a mating surface. The contacts are arranged in two rows along a length direction of the housing. Each contact in a first row has a flat first contact portion exposed to the mating surface. Each contact of a second row has a raised elastic second contact portion behind the first contact portion. The slider can move along the length direction of the housing to drive the second contact portions alternatively hiding below the mating surface or protruding out of the mating surface.

20 Claims, 6 Drawing Sheets

ELECTRONIC CARD WITH PROTECTING MECHANISM FOR PROTECTING CONTACTS THEREOF

BACKGROUND OF THE INVENTION

1. Field of the Invention

The present invention relates to electronic card, more particularly to electronic card with protecting mechanism for protecting contacts thereof.

2. Description of Related Art

When USB 3.0 proposal was standardized by the USB Implementers Forum (USB-IF) at the end of 2008, an electronic card which is designed with an USB 3.0 plug becomes available in the market to mate with a standard USB 3.0 receptacle connector. Such an electronic card comprises a housing and a plurality of first and second contacts retained on the housing. Each first contact has a flat first contact portion, and each second contact has a raised elastic second contact portion. The housing has a mating surface to mate with a corresponding surface which is positioned with contacts of the USB 3.0 receptacle connector. The first contact portions are upwardly exposed on the mating surface. The second contact portions flexibly and upwardly extend beyond the mating surface. Therefore, when the electronic card is not used, the raised second contact portions are exposed to the exterior and are easily destroyed by collision of other thing or people.

Hence, an improved electronic card is desired to overcome the above problems.

BRIEF SUMMARY OF THE INVENTION

According to one aspect of the present invention, an electronic card comprises: a housing having a mating surface; a plurality of contacts retain on the housing and arranged in two rows along a length direction of the housing, each contact in a first row having a flat first contact portion exposed to the mating surface, and each contact of a second row having a raised elastic second contact portion behind the first contact portion; and a slider movably retained on the housing; wherein the slider is movable along the length direction of the housing to drive the second contact portions alternatively hiding below the mating surface or protruding out of the mating surface.

According to another aspect of the present invention, an electronic card comprises: a housing having a mating surface; a plurality of first contacts retain on the housing, each first contact having a raised elastic contact portion; and a slider movably retained on the housing; wherein the slider moves along a length direction of the housing to drive the contact portions alternatively hiding below the mating surface or protruding out of the mating surface.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Reference will be made to the drawing figures to describe the present invention in detail, wherein depicted elements are not necessarily shown to scale and wherein like or similar elements are designated by same or similar reference numeral through the several views and same or similar terminology.

Figure 1:
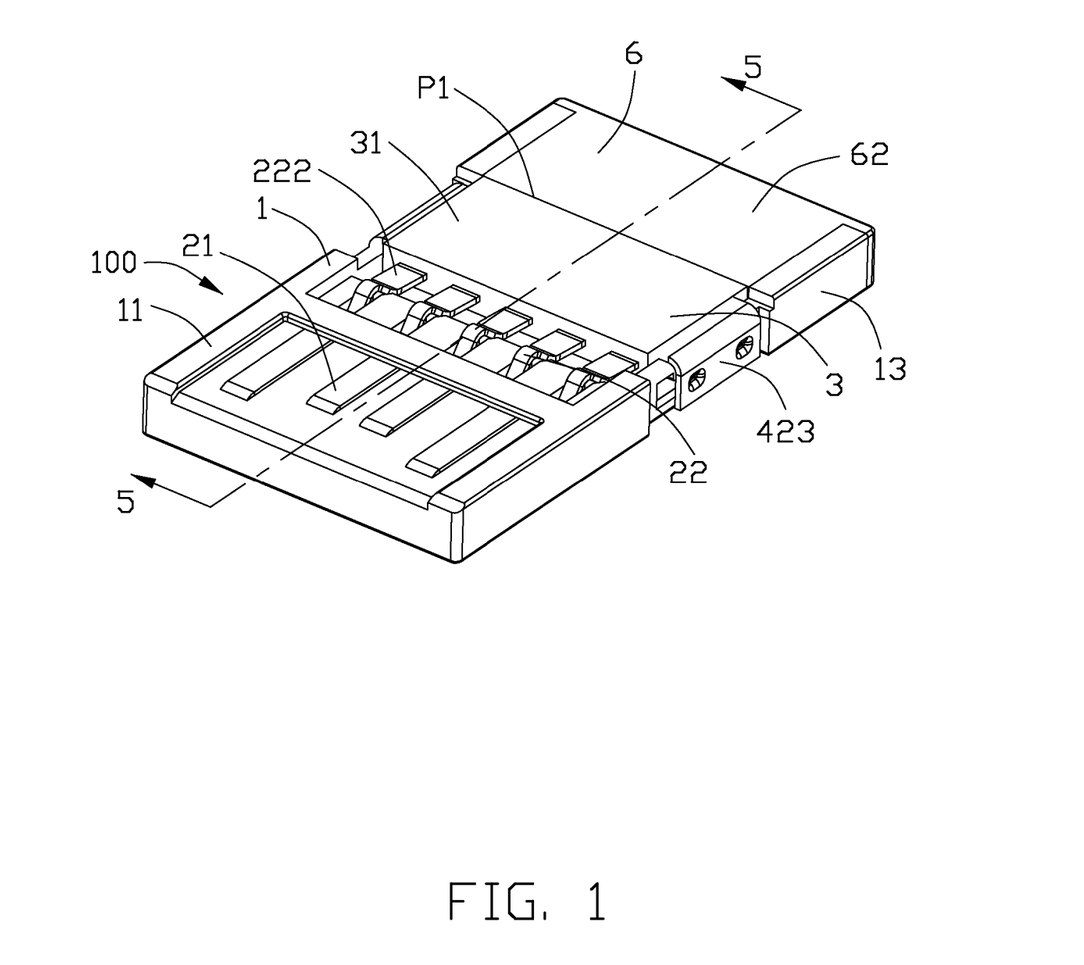
FIG. 1 is a perspective view of an electronic card according to the present invention when a slider thereof is located at a first position.
Figure 2:
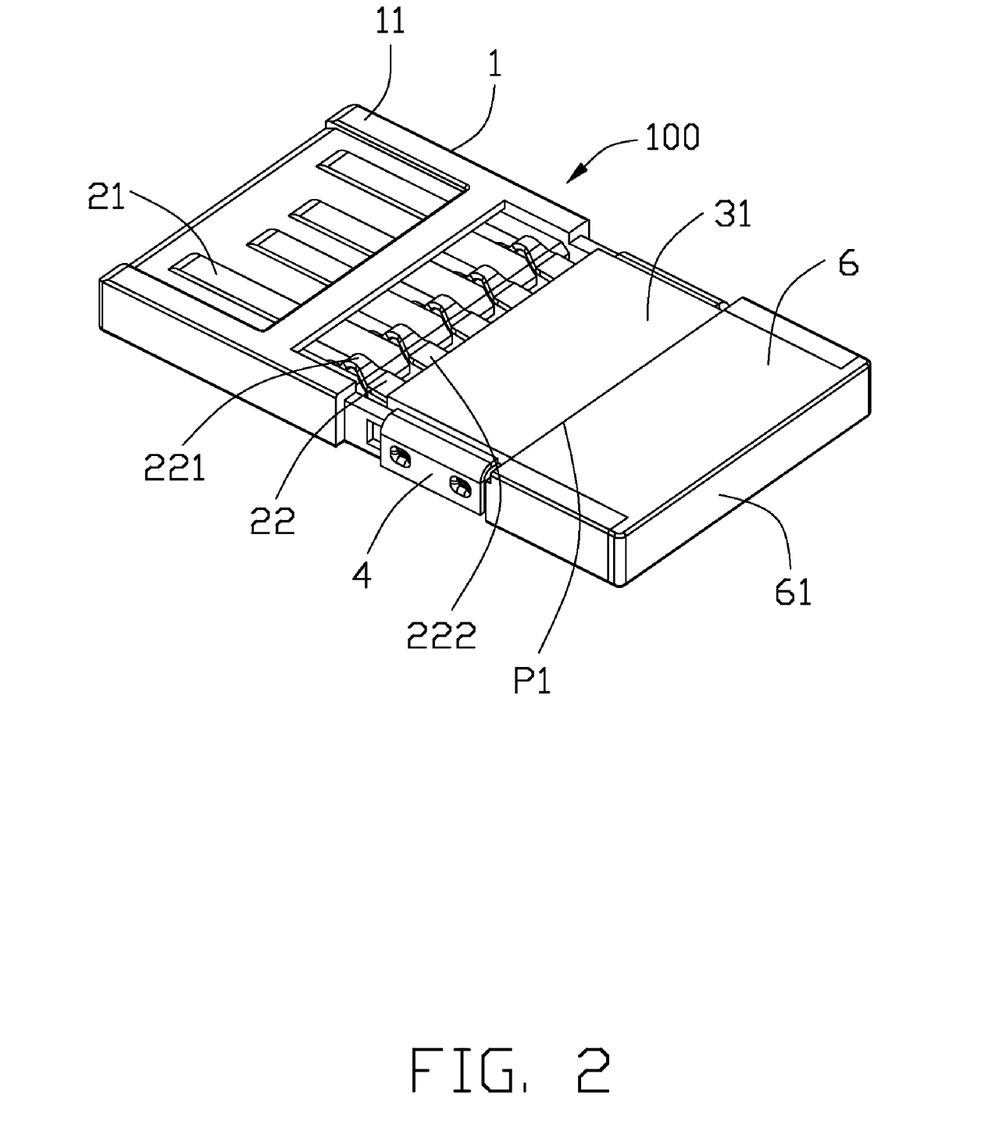
FIG. 2 is a view similar to FIG. 1, while taken from a different aspect.
Figure 3:
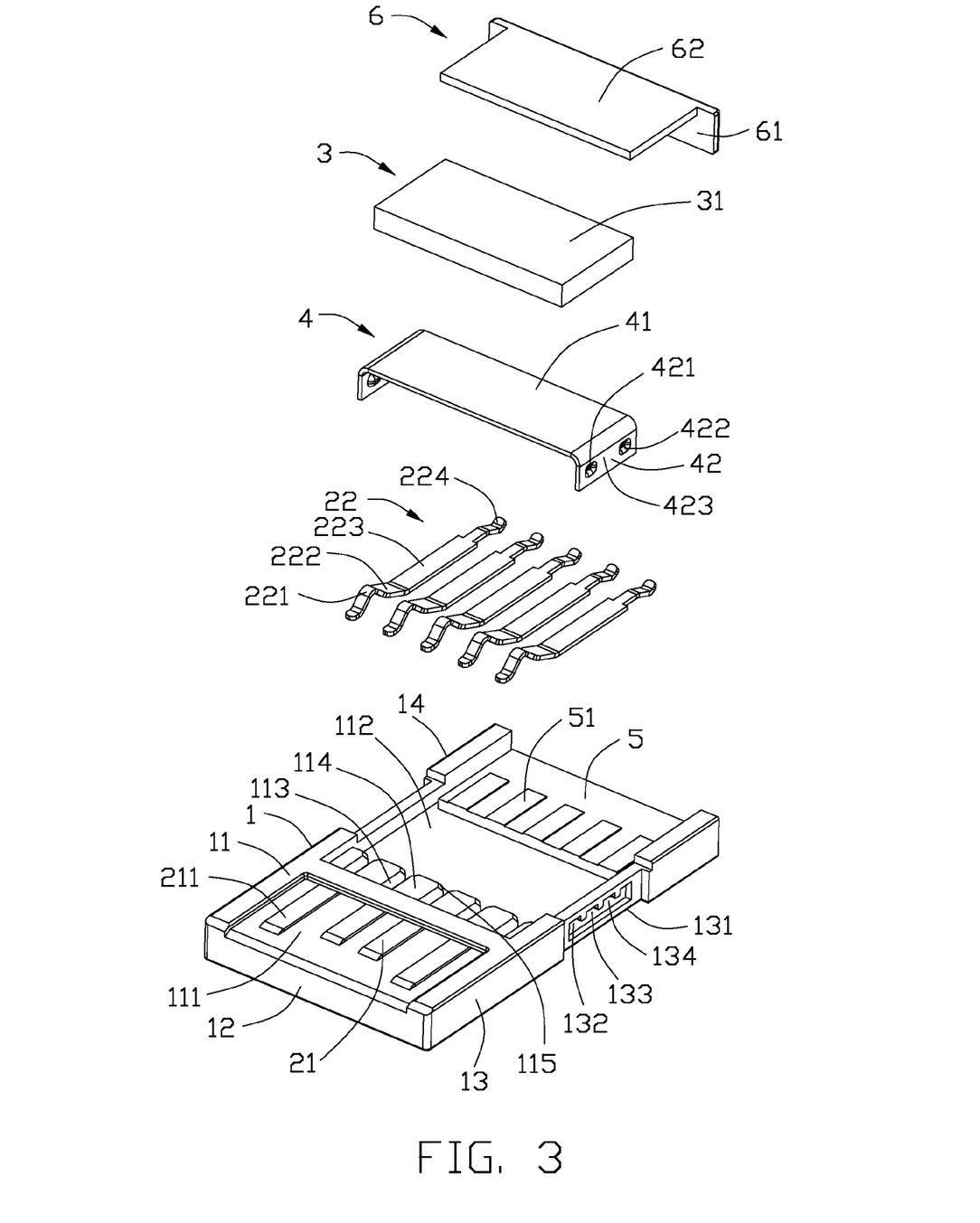
FIG. 3 is an exploded view of the electronic card shown in the FIG. 1.

Referring to FIGS. 1-3, an electronic memory card 100 is a USB 3.0 flash drive and comprises a housing 1, a plurality of first contacts 21 and a slider 3 retained in the housing 1, a plurality of second contacts 22 retained in the slider 3, a metal plate 4 insert molded in the slider 3, a circuit board 5 retained on the housing 1 and a rear cover 6 covering the circuit board 5.

Referring to FIG. 3, the housing 1 is a rectangular insulator and extends along a front to back direction. Thereby the front to back direction is a length direction of the housing 1. The housing 1 has a mating surface 11, a front end surface 12 perpendicular to the mating surface 11 and a first side surface 13 and a second side surface 14 at two sides thereof respectively. The first and second side surfaces 13, 14 are perpendicular to the mating surface 11 and front end surface 12 respectively. The housing 1 has a mounting recess 111 recessed downwardly from a front side of the mating surface 11 and forwardly extending through the front end surface 12, a plurality of contact receiving slots 113 behind the mounting recess 111, a plurality of blocks 114 between adjacent two contact receiving slots 113 and a cavity 112 behind the contact receiving slots 113 along the front to back direction. The housing 1 is formed with a resisting wall at a front upper end of the contact receiving slots 113. The contact receiving slots 113 communicate with the cavity 112 along the front to back direction. Each block 114 has an oblique guiding face 115 at a rear end thereof to guide and support the second contacts 22.

The first side surface 13 and the second side surface 14 are same to each other, thereby the first side surface 13 would be described in detail in following specification, and the second side surface 14 would not be described. The housing 1 defines a first positioning slot 131 recessed inwardly from the first side surface 13 and a first hole 132, a second hole 133 and a third hole 134 further recessed inwardly from an inner wall of the first positioning slot 131. The first hole 132, second hole 133 and third hole 134 are spaced apart from each other along the front to back direction.

The first and second contacts 21, 22 are arranged in two rows along the length direction, and the first contacts 21 are arranged in a first row, and the second contacts 22 are arranged in a second row. The first contacts 21 are USB 2.0 contacts which can mate with a standard USB 2.0 receptacle (not shown) to transmit USB 2.0 signals. All the first and second contacts 21, 22 are formed as USB 3.0 contacts which can mate with a standard USB 3.0 receptacle (not shown) to transmit USB 3.0 signals. Each first contact 21 has a flat first contact portion 211 flatly positioned in the mounting recess 111 and upwardly exposing to the mating surface 11. Because the first contact portions 211 are flat and flatly jointed with an inner wall of the recess 111, the first contact portions 211 are retained on the housing 1 stably and can not be destroyed via collision of other thing. The first contacts 21 can be retained to the housing 1 via a plurality of slots (not shown) on the housing 1, or directly insert molded in the housing 1. Of course, the first contacts 21 can be alternatively formed by a small circuit board (not shown), then assembling the small circuit board to the housing 1.

Each second contact 22 has an upwardly raised second contact portion 221 located behind the first contact portions 211, a widening portion 222 extending backwardly from a rear end of the second contact portion 221, a securing portion 223 extending backwardly from a rear end of the widening portion 222 and a resisting portion 224 protruding downwardly from a rear end of the securing portion 223. The second contact portions 221 are cantileveredly received in the contact receiving slots 113, thereby the second contact portions 221 can flexibly move in the receiving slots 113 along an up to down direction. The first contact portions 211 are closer to the front end surface 12 than the second contact portions 221. The widening portion 222 is wider than the second contact portion 221 along a transverse direction of the housing 1. The widening portions 222 stand upon the guiding faces 115 and downwardly resist the guiding faces 115. The resisting portions 224 protrude downwardly to contact with the circuit board 5.

The slider 3 is made of insulative material and insert molded around the securing portions 223 of the second contacts 22. The slider 3 is movably received in the cavity 112 and can move along the length direction. Referring to FIGS. 1-4, the housing 1 defines a first position P1 and a second position P2. The first position P1 is farther to the front end surface 12 than the second position P2. The slider 3 can move between the first position P1 and the second position P2. The slider 3 has an upper surface 31. The upper surface 31 is located below the mating surface 11 or coplanar with the mating surface 11 when the slider 3 is assembled to the cavity 112, thereby a thickness of the electronic card 1 is not increased.

The metal plate 4 is retained to the slider 3 to position the slider 3 to the housing 1. The metal plate 4 in the present invention is made of metal material, and has a main body 41 and a pair of positioning portions 42 extending downwardly from two sides of the main body 41. The main body 41 is insert molded in the slider 3 and located at an upper side of the securing portions 223 of the second contacts 22. Of course, the main body 41 can be alternatively made of insulative material and unitary formed with the slider 3, and the positioning portions 42 can alternatively extend outwardly and downwardly from two sides of the slider 3.

The positioning portions 42 are movably retained in the positioning slots 131 at two sides of the housing 1. Each positioning slot 131 defines a length which is longer than that of the positioning portion 42 to provide a space in which the positioning portions 42 can move along the length direction. Each positioning portion 42 has a first positioning projection 421 and a second positioning projection 422 projecting inwardly from an inner side thereof. The first and second positioning projections 421, 422 are arranged in the length direction to engage with the holes 132, 133, 134 on the housing 1. The positioning portion 42 has an outer surface 423 which is located at an inner side of corresponding side surfaces 13, 14 of the housing 1 or coplanar with the corresponding side surfaces 13, 14, thereby a width of the electronic card 100 will not be increased. Of course, each positioning portion 42 can be alternatively designed with only one positioning projection 421, and the housing 1 can be alternatively designed with two holes to lock with the positioning projection 421 respectively when the slider 3 located at the first position P1 or the second position P2.

The circuit board 5 is retained to the housing 1 and located behind the first position P1. The circuit board 5 comprises a plurality of metal fingers 51 at a front and upper side thereof to electrically contact with the resisting portions 224 of the second contacts 22, and a plurality of conductive contacts (not shown) at a lower side thereof to stationarily electrically contact with a rear end of the first contacts 21. The metal finger 51 defines a length which is longer than a distance of the slider 3 moves along the length direction of the housing 1, thereby the resisting portions 224 can be assured to move upon and contact with the metal fingers 51 in a process of the slider 3 moving from the first position P1 to the second position P2. Besides, the circuit board 5 can be designed with a plurality of memory chips (not shown) thereon to storage much data or other materials.

The rear cover 6 is retained to a rear side of the housing 1. The rear cover 6 has a rear wall 61 and an abutting wall 62 extending forwardly from a top end of the rear wall 61. The rear wall 61 covers a rear end of the housing 1 to prevent the circuit board 5 from moving backwardly. The abutting wall 62 is fastened between the side surfaces 13, 14 of the housing 1. The abutting wall 62 downwardly abuts against the resisting portions 224 of the second contacts 22 to assure the resisting portions 224 stably contact with the circuit board 5 and prevent the resisting portions 224 from moving upwardly.

Figure 4:
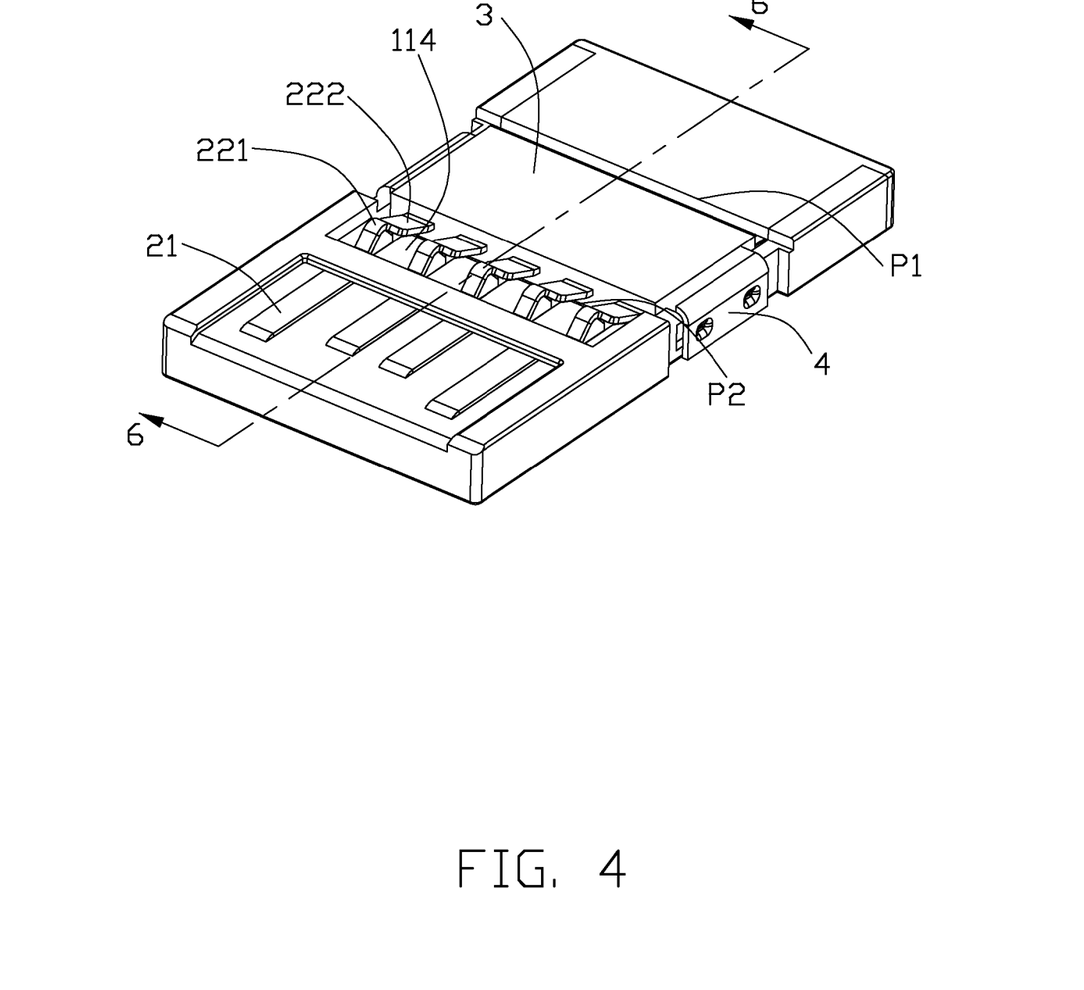
FIG. 4 is a perspective view of the electronic card shown in FIG. 1 while the slider thereof is located at a second position.
Figure 5:
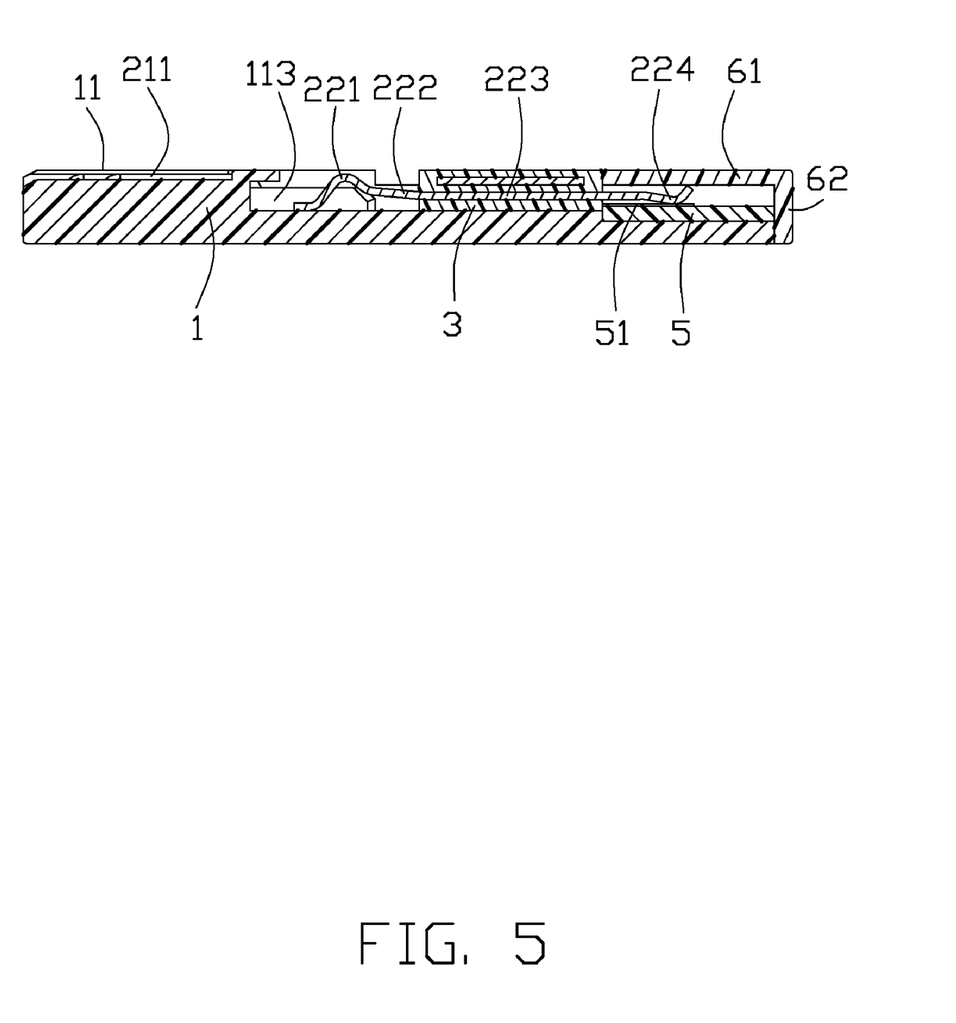
FIG. 5 is a cross-sectional view taken along line 5-5 of FIG. 1 shown a second contact portion is lower than a mating surface of a housing thereof when the slider is located at the first position.

Referring to FIGS. 4 and 5, when the slider 3 is located at the first position P1 and the second contacts 22 need not to mate with a corresponding receptacle, the first and second positioning projections 421, 422 fasten with the second and third holes 133, 134 respectively; the second contact portions 221 are hidden in the contact receiving slots 113 and located below the mating surface 11; a front distal end of the second contact portions 221 contact with a inner lower wall of the cavity 112; and a front end of the widening portions 222 are located upon the guiding face 115; and the resisting portions 224 contact with a rear area of the metal fingers 51 respectively.

In the process of the slider 3 moving forwardly from the first position P1 to the second position P2, the slider 3 drives the second contacts 22 and the positioning portions 42 moving synchronously. Then the widening portions 222 move forwardly along the guiding face 115 and are put up by the guiding face 115 gradually; at the same time, the second contact portions 221 are pushed to move forwardly and upwardly; the resisting portions 224 move on the metal fingers 51 along the length direction.

Figure 6:
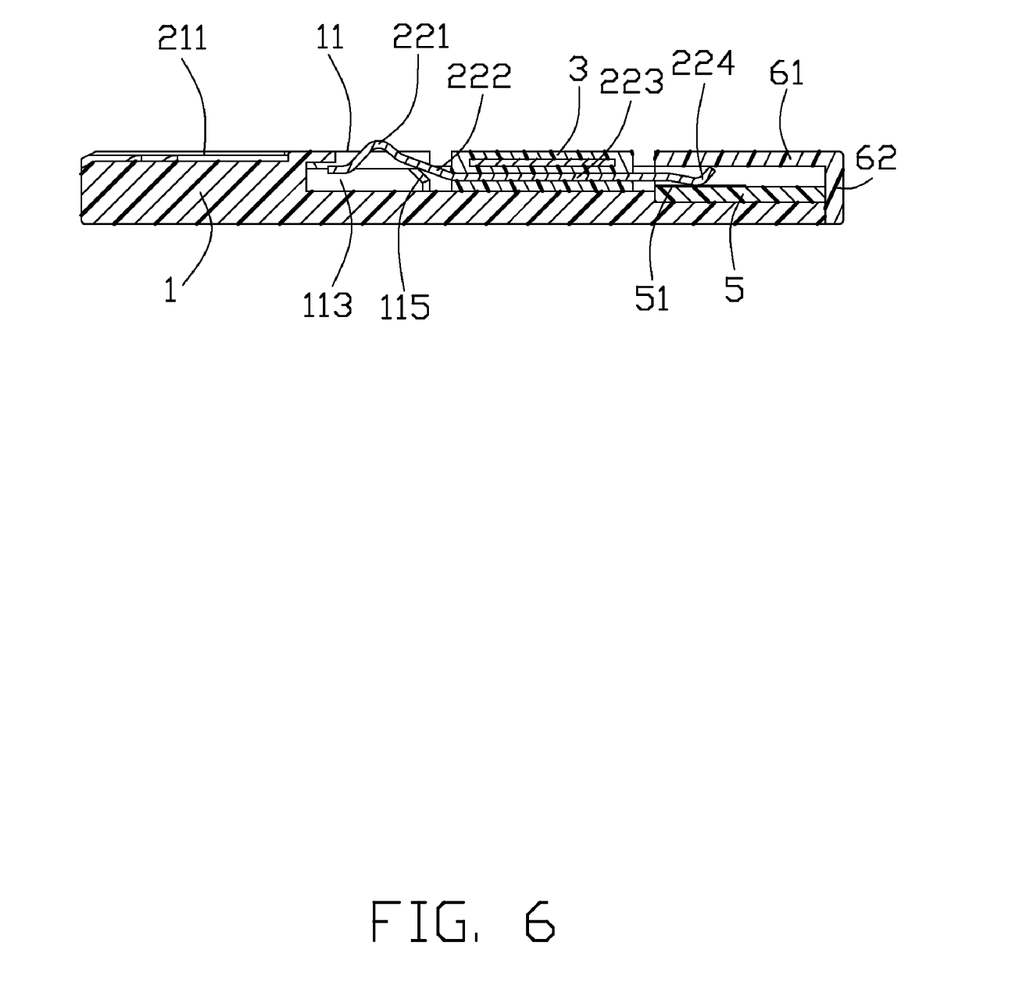
FIG. 6 is a cross-sectional view taken along line 6-6 of FIG. 4 shown the second contact portion protrudes out of the mating surface when the slider is located at the second position.

Referring to FIG. 6, when the slider 3 moves to the second position P2, the second contact portions 221 protrude out of the mating surface 11; the front distal ends of the second contact portions 221 abuts against a lower side of the resisting wall of the housing 1 to prevent the second contact portions 221 from overly protrude out of the mating surface 11; the resisting portions 224 electrically connect with a front area of the metal fingers 51; and the first and second positioning projections 421, 422 fasten with the first and second holes 132, 133 respectively to position the slider 3 to the second position P2 and prevent the slider 3 from moving backwardly; then the second contact portions 221 can be used to electrically connect with a corresponding receptacle.

As fully described above, when only the first contacts 21 need to be used, the slider 3 can be positioned to the first position P1, then the second contact portions 221 are hidden in the contact receiving slots 113 below the mating surface 11 and can not be destroyed by collision of other thing or people. When all the first and second contacts 21, 22 need to be used, the slider 3 can be pushed to the second position P2, then the second portions 221 protrude out of the mating surface 11 to electrically contact with contacts of a corresponding connector (not shown). Therefore, the slider 3 presents as a protecting mechanism to protect the second contact portions 221 from being destroyed when the second contact portions 2 are not used.

Of course, the second contacts 22 can be alternatively fastened to the housing 1 directly via the securing portions 223, and the slider 3 can move along the length direction relative to the second contacts 22. Then the slider 3 can be designed with a guiding face which can drive the second contact portions 221 alternatively to hide below the mating surface 11 or protrude out of the mating surface 11 when the slider 3 moves between the first position P1 to the second position P2. Besides, when the electronic card 100 is alternatively designed only with the second contacts 22, the protecting mechanism also can be used to protect the raised contact portions 221 of the second contacts 22.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. An electronic card comprising:
a housing having a mating surface and a front end surface perpendicular to the mating surface;
a plurality of contacts retain on the housing and arranged in two rows along a length direction of the housing, each contact in a first row having a flat first contact portion exposed to the mating surface, and each contact of a second row having a raised elastic second contact portion behind the first contact portion, the flat first contact portion being in front of the elastic second contact portion and near the front end surface; and
a slider movably retained on the housing;
wherein the slider is movable along the length direction of the housing to drive the second contact portions alternatively hiding below the mating surface or protruding out of the mating surface.

2. The electronic card as claimed in claim 1, wherein the electronic card is a USB 3.0 flash drive, the housing defines a first position and a second position arranged along the length direction behind the first contact portions, the first position is farther to the front end surface than the second position, and the slider moves between the first and second positions.

3. The electronic card as claimed in claim 2, wherein each contact in the second row has a securing portion positioned in the slider and moving together with the slider, the second contact portions move from hiding below the mating surface to protruding out of the mating surface when the slider moves from the first position to the second position.

4. The electronic card as claimed in claim 3, wherein each contact in the second row has a widening portion extending backwardly from a rear end of the second contact portion, the widening portion is wider than the second contact portion along a transverse direction of the housing, and the housing has a plurality of contact receiving slots and a plurality of blocks between adjacent two contact receiving slots, the second contact portions are cantileveredly received in the contact receiving slots, the widening portions stand upon the blocks for driving the second contact portions protruding out of the mating surface when the slider moves to the second position.

5. The electronic card as claimed in claim 4, wherein each block has an oblique guiding face to guide and support the widening portions upwardly.

6. The electronic card as claimed in claim 3, further comprising a positioning portion retained on the slider, the positioning portion has at least a positioning projection to engage with the housing for positioning the slider to the housing.

7. The electronic card as claimed in claim 6, wherein the housing has a side surface perpendicular to the mating surface and the front end surface, a positioning slot recessed inwardly from the side surface and at least two holes further recessed inwardly from an inner wall of the positioning slot, the holes are spaced apart from each other along the length direction to lock with the positioning projection respectively when the slider is located at the first position or the second position.

8. The electronic card as claimed in claim 7, wherein the positioning slot defines a length which is longer than that of the positioning portion along the length direction.

9. The electronic card as claimed in claim 4, wherein the housing defines a cavity behind the contact receiving slots and communicate with the contact receiving slots along the length direction, the slider is movably retained in the cavity and defines an upper surface which is not higher than the mating surface.

10. The electronic card as claimed in claim 9, further comprising a circuit board retained in the housing and located behind the slider, the circuit board has a plurality of metal fingers at a front upper side thereof, each contact in the second row has a resisting portion protruding downwardly at a rear end thereof to engage with the metal fingers and moving on the metal fingers along the length direction when the slider moves between the first and second positions, and each contact in the first row has a rear end stationarily contacting with a plurality of conductive contacts on a lower side of the circuit board.

11. The electronic card as claimed in claim 10, further comprising a rear cover retained at a rear side of the housing, the rear cover has a rear wall covering a rear end of the housing and an abutting wall retained between the side surface to downwardly resist the resisting portions for assuring a stable connection between the resisting portions and the metal fingers.

12. An electronic card comprising:
a housing having a mating surface;

a plurality of first contacts retained on the housing, each first contact having a raised elastic contact portion; and
a slider movably retained on the housing;
wherein the slider moves along a length direction of the housing to drive the contact portions alternatively hiding below the mating surface or protruding out of the mating surface, and the first contact is secured to the slider rather than the housing so as to move together with the slider.

13. The electronic card as claimed in claim 12, wherein the housing has a front end surface perpendicular to the mating surface, the housing defines a first position and a second position arranged along the length direction, the first position is farther to the mating surface than the second position, and both the slider and first contact can move between the first and second positions.

14. The electronic card as claimed in claim 13, wherein each first contact has a securing portion positioned in the slider and moving together with the slider, the contact portions moves from hiding below the mating surface to protruding out of the mating surface when the slider moves from the first position to the second position.

15. The electronic card as claimed in claim 14, wherein each first contact has a widening portion extending backwardly from a rear end of the contact portion and a resisting portion extending downwardly from a rear end of the securing portion to connect with a circuit board, the widening portion is wider than the contact portion along a transverse direction of the housing, and the housing has a plurality of contact receiving slots and a plurality of blocks between adjacent two contact receiving slots, the contact portions are cantileveredly received in the contact receiving slots, the widening portions move upon the blocks to drive the contact portions protruding out of the mating surface when the slider moves to the second position.

16. The electronic card as claimed in claim 15, further comprising a positioning portion retained on the slider, the positioning portion has at least a positioning projection, the housing has a first positioning slot recessed from a side surface thereof and at least two holes further recessed from an inner wall of the positioning slot, the holes are spaced apart from each other along the length direction to lock with the positioning projection respectively when the slider is located at the first position or the second position.

17. The electronic card as claimed in claim 16, wherein the housing defines a cavity behind the contact receiving slots and communicate with the contact receiving slots along the length direction, the slider is movably retained in the cavity and defines an upper surface which is not higher than the mating surface.

18. An electronic card comprising:
an insulative housing defining a mating surface thereon;
a first set of contacts exposed upon a front portion of the mating surface;
a second set of contacts located behind the first set of contacts in a front-to-back direction, and alternatively exposed above or hidden under said mating surface;
said first set of contacts and said second set of contacts being configured and dimensioned to comply with a USB 3.0 interface standard having stiff contacting sections of the first set of contacts and resilient contacting sections of the second set of contacts around the mating surface; and
a slider selectively moveable relative to and within the housing between first and second positions; wherein
when said slider is positioned at the first position, said second set of contacts are hidden under the mating surface so as to allow said first set of contacts to connect to a corresponding USB 2.0 connector without risks of jeopardizing said second set of contacts; when said slider is positioned at a second position, said second set of contacts are exposed above the mating surface so as to allow both said first set of contacts and said second set of contacts to simultaneously connect to a corresponding USB 3.0 connector efficiently.

19. The electronic card as claimed in claim 18, wherein said slider is moved relative to the housing along said front-to-back direction.

20. The electronic card as claimed in claim 19, wherein said second set of contacts are associatively moved with the slider.

* * * * *